United States Patent
Ito

(10) Patent No.: US 11,175,872 B2
(45) Date of Patent: Nov. 16, 2021

(54) PRINTER

(71) Applicant: FUNAI ELECTRIC CO., LTD., Osaka (JP)

(72) Inventor: Yuichiro Ito, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 16/937,600

(22) Filed: Jul. 24, 2020

(65) Prior Publication Data

US 2021/0064316 A1 Mar. 4, 2021

(30) Foreign Application Priority Data

Aug. 30, 2019 (JP) .............................. JP2019-158006

(51) Int. Cl.
| | |
|---|---|
| *G06F 3/12* | (2006.01) |
| *H04N 1/00* | (2006.01) |
| *H04N 1/32* | (2006.01) |
| *G06K 15/02* | (2006.01) |

(52) U.S. Cl.
CPC .......... *G06F 3/1265* (2013.01); *G06F 3/1296* (2013.01); *H04N 1/00384* (2013.01)

(58) Field of Classification Search
None
See application file for complete search history.

(56) References Cited

U.S. PATENT DOCUMENTS

| | | | | |
|---|---|---|---|---|
| 5,761,996 | A * | 6/1998 | Gauthier | ............... B41J 3/46 101/292 |
| 6,249,226 | B1 * | 6/2001 | Harrison | ............ G06K 7/0008 340/10.6 |
| 7,552,875 | B2 * | 6/2009 | Slatter | ................... G06K 17/00 235/487 |
| 8,289,550 | B2 | 10/2012 | Shimma | |
| 8,482,782 | B2 | 7/2013 | Shimma | |

(Continued)

FOREIGN PATENT DOCUMENTS

| | | |
|---|---|---|
| EP | 1139649 | 10/2001 |
| EP | 2247091 | 11/2010 |

(Continued)

*Primary Examiner* — Beniyam Menberu
(74) *Attorney, Agent, or Firm* — JCIPRNET

(57) ABSTRACT

A printer including a reading part, a determination part, and a print control part is provided. The reading part reads identification information in a non-contact manner from an RFID tag in which the identification information for identifying a sample image is stored, and the RFID tag is provided on a display medium on which the sample image is displayed. By referring to a storage part in which a plurality of image data including an image data representing the sample image, and a correspondence information data table indicating a correspondence relationship between the plurality of image data and pieces of identification information for identifying the plurality of image data respectively are stored, the determination part determines, from among the plurality of image data, the image data associated with the identification information read by the reading part. The print control part controls printing on a nail based on the determined image data.

6 Claims, 10 Drawing Sheets

(56) References Cited

U.S. PATENT DOCUMENTS

| | | | |
|---|---|---|---|
| 2004/0152440 A1* | 8/2004 | Yoda | H04L 12/2801 |
| | | | 455/403 |
| 2004/0179228 A1* | 9/2004 | McCluskey | H04N 1/32133 |
| | | | 358/1.15 |
| 2004/0194133 A1* | 9/2004 | Ikeda | H04N 1/00342 |
| | | | 725/37 |
| 2006/0227161 A1* | 10/2006 | Otsuki | B41J 2/1752 |
| | | | 347/19 |
| 2007/0139711 A1* | 6/2007 | Miyata | H04N 1/00342 |
| | | | 358/1.18 |
| 2009/0087243 A1* | 4/2009 | Niiyama | G06K 17/00 |
| | | | 400/76 |
| 2009/0316216 A1* | 12/2009 | Nakajima | H04N 1/0408 |
| | | | 358/447 |
| 2018/0361736 A1 | 12/2018 | Irie | |
| 2019/0294625 A1* | 9/2019 | Bentz | G06F 16/4393 |

FOREIGN PATENT DOCUMENTS

| | | | | |
|---|---|---|---|---|
| JP | 2004172837 | * | 6/2004 | G06K 17/00 |
| JP | 2010011364 | | 1/2010 | |

\* cited by examiner

PRINTER

CROSS-REFERENCE TO RELATED APPLICATION

This application claims the priority benefits of Japan Patent Application No. 2019-158006, filed on Aug. 30, 2019. The entirety of the above-mentioned patent application is hereby incorporated by reference herein and made a part of this specification.

BACKGROUND

Technical Field

The disclosure relates to a printer for printing on a recording medium.

Related Art

Printers for printing on a recording medium are known (for example, referring to Patent Document 1: Japanese Patent Application Laid-open No. 2010-11364). A conventional printer is connected to an external device such as a smartphone, a tablet terminal, a personal computer, and a digital camera in a wired or wireless manner, so that it can communicate with the external device. By transmitting image data from the external device to the printer, the printer performs printing based on the image data.

SUMMARY

In the conventional printer described above, when performing printing by the printer, a user connects the printer to the external device in a wired or wireless manner, and afterwards, it is necessary to perform an operation of transmitting the image data in the external device to the printer. Therefore, it takes time and labor for the user.

Therefore, the disclosure provides a printer capable of performing printing through a simple operation.

A printer according to an aspect of the disclosure is a printer for printing on a recording medium. The printer includes a reading part, a determination part, and a print control part. The reading part reads specific identification information in a non-contact manner from a non-contact tag in which the specific identification information for identifying a specific image is stored, and the non-contact tag is provided on a display medium on which the specific image is displayed. By referring to a storage device in which a plurality of image data including a specific image data representing the specific image and correspondence information indicating a correspondence relationship between the plurality of image data and a plurality of pieces of identification information for identifying the plurality of image data respectively are stored, the determination part determines, from among the plurality of image data, the specific image data associated with the specific identification information read by the reading part. The print control part controls printing on the recording medium based on the determined specific image data.

According to this aspect, in the case where the user wants to print on the recording medium the specific image displayed on the display medium, the specific identification information stored in the non-contact tag provided on the display medium is read by the reading part in a non-contact manner. Thereby, the specific image data associated with the specific identification information read by the reading part is determined from among the plurality of image data stored in the storage device, and printing is performed on the recording medium based on the specific image data. Therefore, since the user may simply perform at least the operation of having the non-contact tag read by the reading part in a non-contact manner, the user's labor can be saved and printing can be performed through a simple operation.

For example, the printer according to an aspect of the disclosure may be configured in the following manner. A plurality of images including the specific image are displayed on the display medium. The plurality of pieces of identification information, including the specific identification information, for identifying the plurality of images respectively are stored in the non-contact tag. The reading part reads the plurality of pieces of identification information from the non-contact tag in a non-contact manner. The printer further includes a reception part which receives an operation of selecting the specific identification information among the plurality of pieces of identification information read by the reading part. By referring to the storage device in which the plurality of image data respectively representing the plurality of images and the correspondence information are stored, the determination part determines, from among the plurality of image data, the specific image data associated with the specific identification information of which a selecting operation has been received by the reception part.

According to this aspect, in the case where the user wants to print on the recording medium the specific image among the plurality of images displayed on the display medium, the plurality of pieces of identification information stored in the non-contact tag provided on the display medium are read by the reading part in a non-contact manner. Further, by using the reception part, the user performs an operation of selecting the specific identification information corresponding to the specific image desired to be printed. Thereby, from among the plurality of image data stored in the storage device, the specific image data associated with the specific identification information of which the selecting operation is received by the reception part is determined, and printing is performed on the recording medium based on the specific image data. Therefore, since the user may simply at least have the non-contact tag read by the reading part in a non-contact manner and perform the operation of selecting the specific identification information corresponding to the specific image desired to be printed, the user's labor can be saved and printing can be performed through a simple operation.

For example, the printer according to an aspect of the disclosure may be configured in the following manner. The display medium further displays a plurality of first identifiers respectively associated with the plurality of images displayed on the display medium. The reception part includes a plurality of operation buttons which respectively display a plurality of second identifiers respectively corresponding to the plurality of first identifiers and receive operations of respectively selecting the plurality of pieces of identification information read by the reading part.

According to this aspect, in the case where the user wants to print on the recording medium the specific image among the plurality of images displayed on the display medium, among the plurality of operation buttons, the user may simply operate the operation button displaying the second identifier corresponding to the first identifier which is associated with the specific image and is displayed on the display medium. Thereby, the user can easily perform the operation of selecting the specific identification information corresponding to the specific image desired to be printed.

For example, the printer according to an aspect of the disclosure may be configured such that each of the plurality of first identifiers and the plurality of second identifiers includes at least one of a character, a number, a symbol, and a graph.

According to this aspect, each of the plurality of first identifiers and the plurality of second identifiers can be displayed in an easily understandable manner.

For example, the printer according to an aspect of the disclosure may be configured such that the display medium is formed in a sheet shape, and the plurality of images and the plurality of first identifiers are displayed on a surface of the display medium.

According to this aspect, the user can easily operate the display medium.

For example, the printer according to an aspect of the disclosure may be configured in the following manner. The printer further includes a housing which accommodates therein a printing part. A placement area for placing the display medium is arranged on the housing. The reading part is arranged corresponding to the placement area.

According to this aspect, by placing the display medium on the placing area of the housing, the user can have the non-contact tag read by the reading part in a non-contact manner. Thereby, printing can be performed through an even simpler operation.

For example, the printer according to an aspect of the disclosure may be configured such that a recess for positioning the display medium is formed in the placement area.

According to this aspect, by placing the display medium in the recess of the placement area of the housing, the user can easily position the display medium on the placement area.

For example, the printer according to an aspect of the disclosure may be configured such that a placement part for placing the recording medium is arranged inside the housing, and a viewing window for viewing the placement part from outside of the housing when aligning the recording medium on the placement part is further formed on the housing.

According to this aspect, by viewing the placement part from outside of the housing through the viewing window, the user can easily align the recording medium on the placement part.

According to the printer of an aspect of the disclosure, printing can be performed through a simple operation.

DESCRIPTION OF THE EMBODIMENTS

Hereinafter, embodiments of the disclosure will be described in detail with reference to the drawings. It is noted that each of the embodiments described below shows a comprehensive or specific example. The numerical values, shapes, materials, constituent elements, arrangement positions and connection forms of the constituent elements, and the like shown in the following embodiments are illustrative and are not intended to limit the disclosure. Further, among the constituent elements in the following embodiments, constituent elements which are not described in the independent claim are described as any constituent elements.

First Embodiment

[1-1. Structure of Printer]

Figure 1:
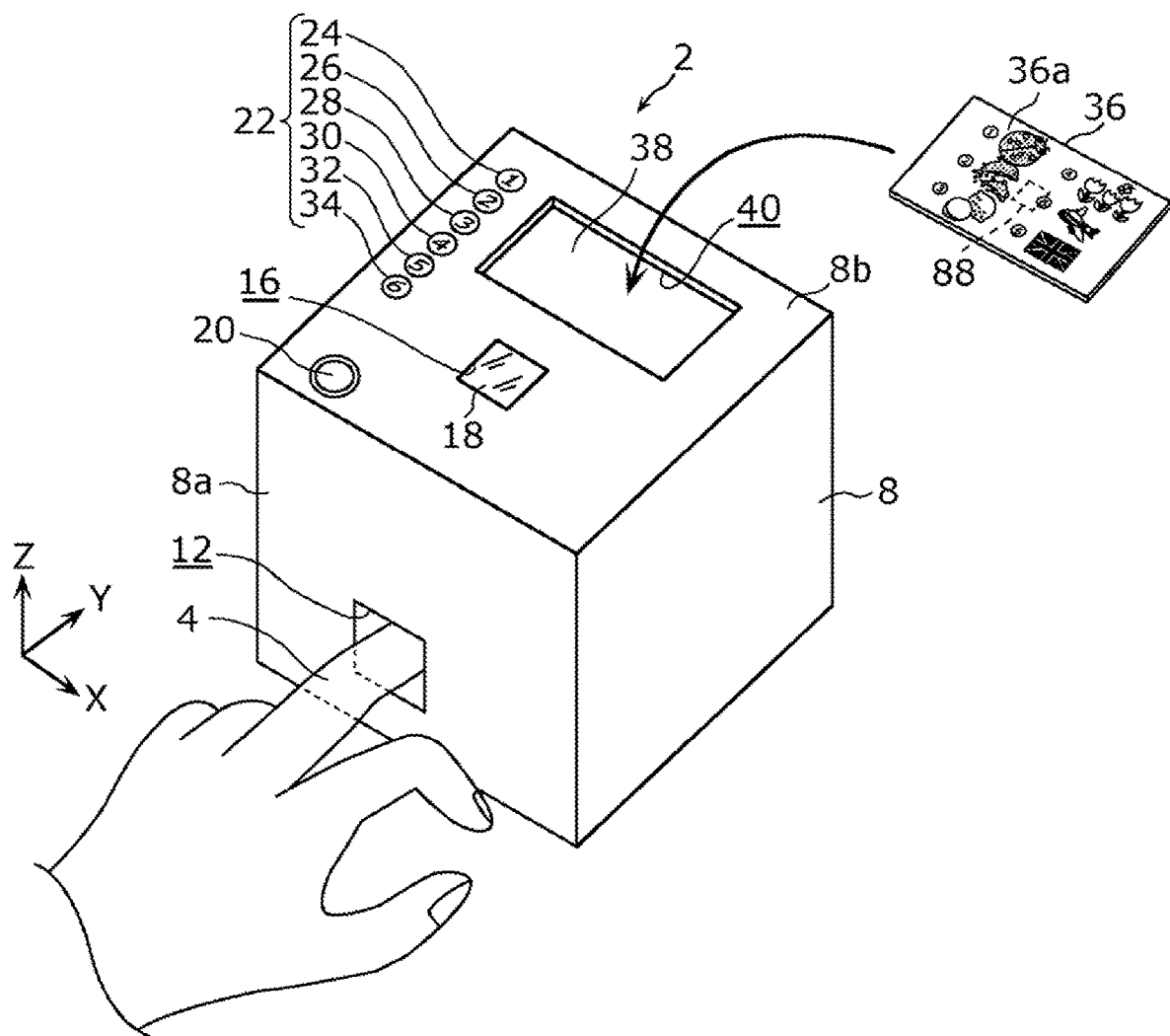
FIG. 1 is a perspective view showing a printer according to a first embodiment.
Figure 2:
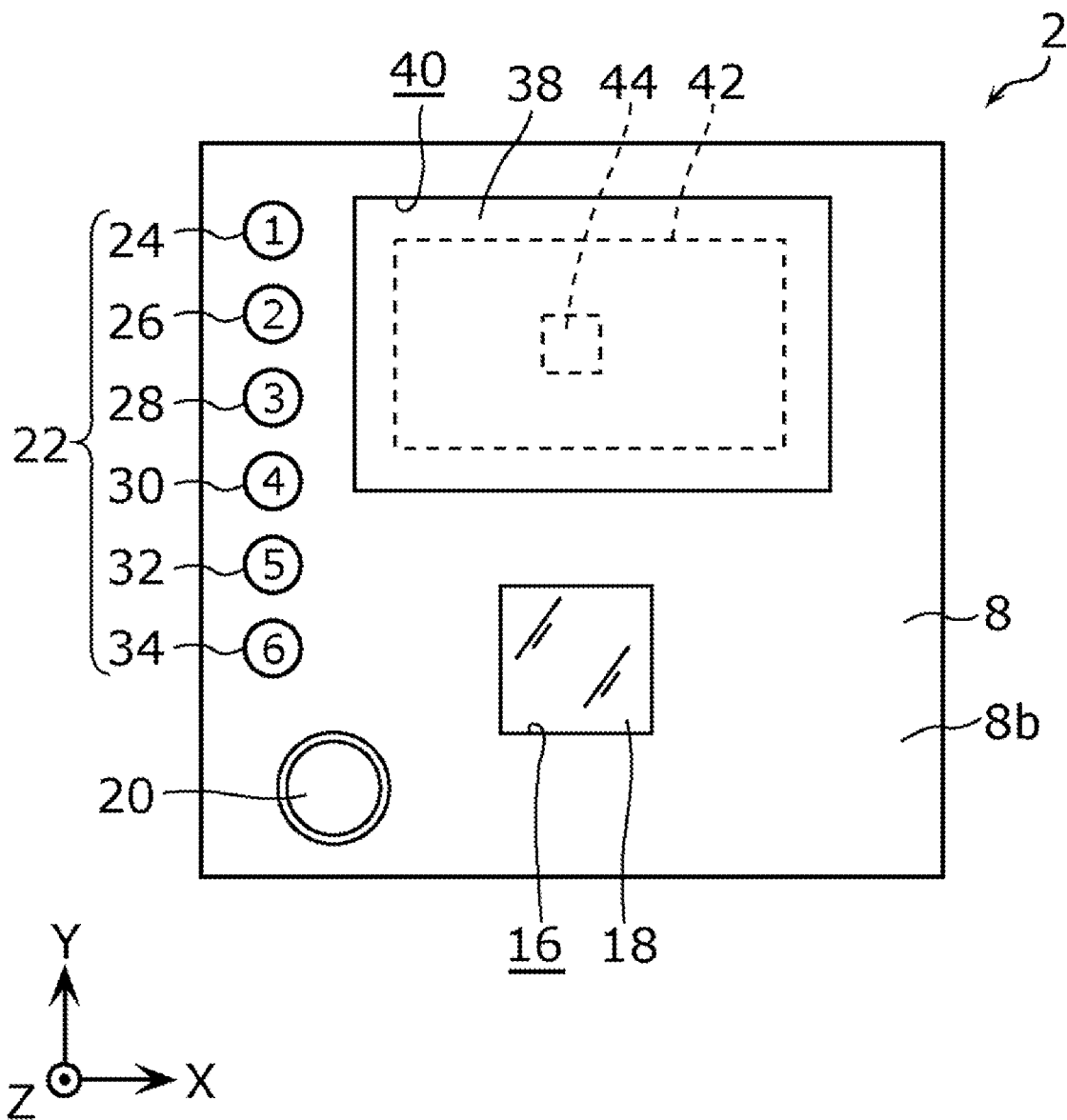
FIG. 2 is a plan view showing the printer according to the first embodiment.
Figure 3:
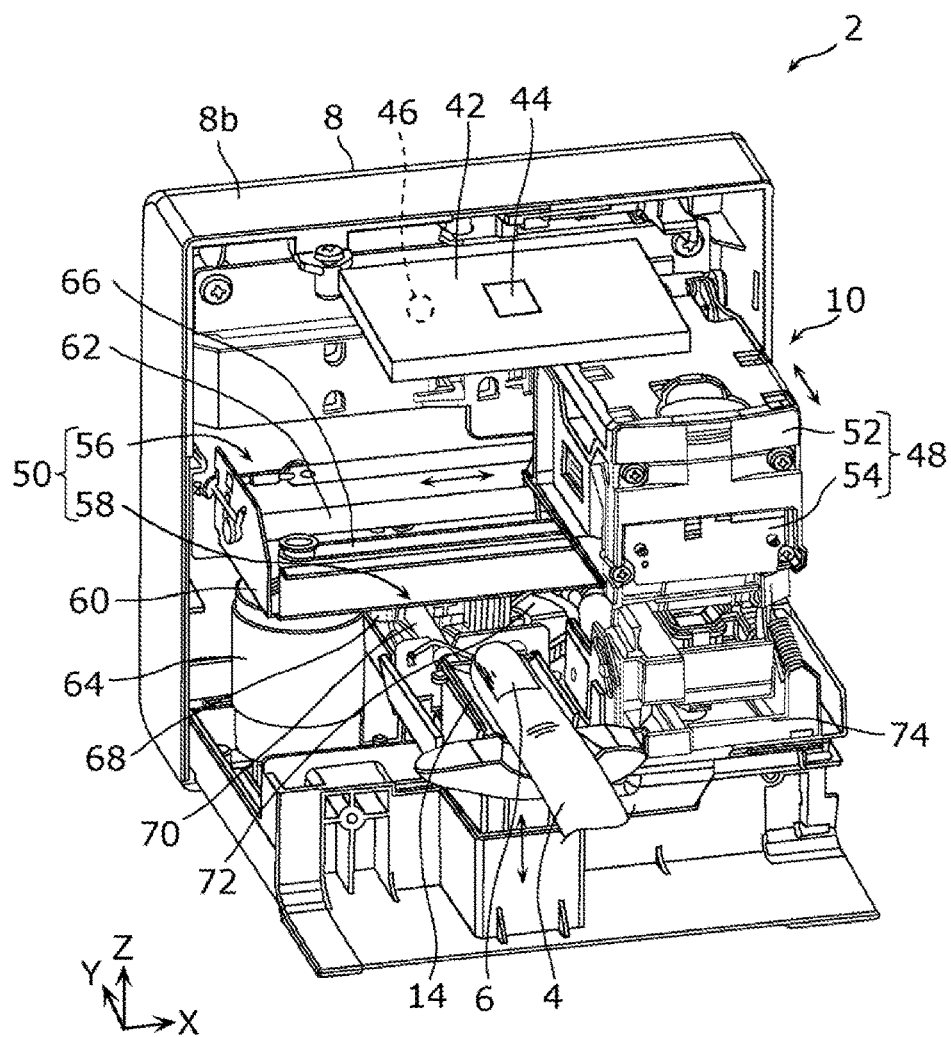
FIG. 3 is a perspective view showing an internal structure of the printer according to the first embodiment.

First, referring to FIG. 1 to FIG. 3, the structure of a printer 2 according to the first embodiment will be described. FIG. 1 is a perspective view showing the printer 2 according to the first embodiment. FIG. 2 is a plan view showing the printer 2 according to the first embodiment. FIG. 3 is a perspective view showing the internal structure of the printer 2 according to the first embodiment.

In the present embodiment, the printer 2 is a so-called nail printer for printing, for example, a pattern on a nail 6 (i.e., an example of a recording medium) of a finger 4 of a user's hand. As shown in FIG. 1 to FIG. 3, the printer 2 includes a housing 8 and a printing unit 10 arranged inside the housing 8.

As shown in FIG. 1, the housing 8 is formed in a box shape, for example. An opening 12 for inserting the user's finger 4 is provided on a front surface 8*a* of the housing 8. As shown in FIG. 3, a finger holder 14 (i.e., an example of a placement part) for placing the user's finger 4 is arranged on the lower side of the opening 12 (i.e., the negative side of the Z axis). Further, a pressing cover (not shown) for pressing the user's finger 4 from above is arranged on the upper side of the opening 12 (i.e., the positive side of the Z axis). The finger holder 14 is movable in the up-down direction (i.e., the Z-axis direction) with respect to the pressing cover and is urged by a spring (not shown) in a direction approaching the pressing cover.

As shown in FIG. 3, with the nail 6 of the finger 4 facing upward, the user inserts the finger 4 in a straightened state into the opening 12 of the housing 8, and places the pulp side of the finger 4 on the finger holder 14. Thereby, a portion of the finger 4 including the nail 6 (e.g., the portion of the finger 4 from the tip to the vicinity of the first joint) is arranged inside the housing 8. At this time, with the finger holder 14 urged in the direction approaching the pressing cover, for example, the vicinity of the first joint of the finger 4 is clamped from above and below by the pressing cover and the finger holder 14.

As shown in FIG. 1 and FIG. 2, a viewing window 16 is formed on a top surface 8b of the housing 8 to allow viewing of the finger holder 14 arranged inside the housing 8 from outside of the housing 8. The viewing window 16 is arranged directly above the finger holder 14. By viewing the finger holder 14 from outside of the housing 8 through the viewing window 16, the user can align the nail 6 of the finger 4 on the finger holder 14. A light-transmitting plate 18 made of, for example, a light-transmissive resin is arranged at the viewing window 16. The light-transmitting plate 18 is configured to suppress the ink mist generated inside the housing 8 during printing from leaking to outside of the housing 8 and suppress dust and the like outside the housing 8 from entering the inside of the housing 8.

In addition, in the present embodiment, although the light-transmitting plate 18 is arranged at the viewing window 16, a magnifying lens, for example, may be arranged at the viewing window 16 instead of the light-transmitting plate 18. Thereby, the user can view the finger holder 14 in an enlarged manner through the viewing window 16. Further, when the light-transmitting plate 18 or the magnifying lens is contaminated with ink mist or the like, the light-transmitting plate 18 or the magnifying lens may be replaced.

As shown in FIG. 1 and FIG. 2, a print start button 20 for receiving a print start operation by the user is arranged on the top surface 8b of the housing 8. In addition, a reception part 22 for receiving an operation of selecting any identification information (i.e., specific identification information) among a plurality of pieces of identification information read by a reading part 44 as will be described below (referring to FIG. 2 and FIG. 3) is arranged on the top surface 8b of the housing 8.

The reception part 22 has a plurality of operation buttons 24, 26, 28, 30, 32, and 34 (24 to 34) for selecting the plurality of pieces of identification information read by the reading part 44. Numbers "1", "2", "3", "4", "5", and "6" (i.e., an example of a plurality of second identifiers) are respectively displayed on the plurality of operation buttons 24 to 34.

In addition, as shown in FIG. 1 and FIG. 2, a placement area 38 for placing a display medium 36 (referring to FIG. 1) is arranged on the top surface 8b of the housing 8. A recess 40 for positioning the display medium 36 is formed in the placement area 38. The recess 40 is formed in a substantially rectangular shape in the XY plan view. In the XY plan view, the size of the recess 40 is larger than the size of the display medium 36. The configuration of the display medium 36 will be described below.

As shown in FIG. 3, a printed wiring board 42 is arranged inside the housing 8. The printed wiring board 42 is arranged above the finger holder 14. The reading part 44 is mounted on the upper surface of the printed wiring board 42. The reading part 44 is, for example, a circuit module having an RFID (radio frequency identification) tag reader function. As shown in FIG. 2, the reading part 44 is arranged right below the placement area 38 of the housing 8 (i.e., corresponding to the placement area 38) and reads a plurality of pieces of identification information from an RFID tag 88 (referring to FIG. 1) of the display medium 36 placed on the placement area 38 in a non-contact manner.

Further, an LED (light emitting diode) element 46 is mounted on the lower surface of the printed wiring board 42. The LED element 46 is a light source for illuminating the inside of the housing 8. When the user aligns the nail 6 of the finger 4 on the finger holder 14, the LED element 46 turns on, and the finger holder 14 and the nail 6 are illuminated by the LED element 46.

The printing unit 10 is a unit for printing a pattern or the like on the nail 6 of the finger 4 arranged inside the housing 8. The printing method of the printing unit 10 is an inkjet method in which printing is performed by spraying a misty ink on the nail 6 of the finger 4.

As shown in FIG. 3, the printing unit 10 has a head part 48 and a drive mechanism 50.

The head part 48 has a head support part 52 and an ink head 54 mounted on the head support part 52. The ink head 54 is filled with ink of a plurality of colors. A nozzle surface (not shown) which ejects ink downward toward the nail 6 of the finger 4 placed on the finger holder 14 is formed on the lower surface of the head part 48.

The drive mechanism 50 is a mechanism for two-dimensionally moving the head part 48 in a first direction (i.e., the X-axis direction) and a second direction (i.e., Y-axis direction) substantially orthogonal to the first direction. The drive mechanism 50 has an X-axis drive mechanism 56 for moving the head part 48 in the first direction and a Y-axis drive mechanism 58 for moving the head part 48 in the second direction.

The X-axis drive mechanism 56 includes a moving table 60, an X-axis guide shaft 62, an X-axis motor 64, and a timing belt 66.

The X-axis guide shaft 62 is supported on the moving table 60 arranged inside the housing 8 and extends in an elongated shape in the first direction. The head part 48 is movably supported on the X-axis guide shaft 62. The X-axis motor 64 is composed of, for example, a servo motor and is supported on the lower surface of the moving table 60.

The driving force of the X-axis motor 64 is transmitted to the head part 48 via the timing belt 66. Thereby, the head part 48 reciprocates in the first direction along the X-axis guide shaft 62 with respect to the moving table 60.

The Y-axis drive mechanism 58 includes the moving table 60, a bearing member 68, a Y-axis guide shaft 70, a Y-axis motor (not shown), a worm gear (not shown), a worm wheel 72, and a drive conversion mechanism (not shown).

The Y-axis guide shaft 70 is supported on a support plate 74 arranged inside the housing 8 and extends in an elongated shape in the second direction. The bearing member 68 fixed to the lower surface of the moving table 60 is movably supported on the Y-axis guide shaft 70. In other words, the moving table 60 is movably supported on the Y-axis guide shaft 70 via the bearing member 68. The Y-axis motor is composed of, for example, a servo motor and is supported on the support plate 74. The worm gear is rotatably supported on the drive shaft of the Y-axis motor. The worm wheel 72 is rotatably supported on the support plate 74 and meshes with the worm gear.

The drive conversion mechanism is a mechanism for converting rotation of the worm wheel 72 into linear movement of the head part 48 in the second direction. The drive conversion mechanism has a pinion gear formed on the worm wheel 72 and a rack gear formed on the bearing member 68. The pinion gear and the rack gear mesh with each other.

The driving force of the Y-axis motor is transmitted to the moving table 60 via the worm gear, the worm wheel 72, and the drive conversion mechanism. Thereby, the head part 48 reciprocates integrally with the moving table 60 in the second direction along the Y-axis guide shaft 70.

In the state where the head part 48 reciprocates in the first direction and meanwhile moves to one side from another side in the second direction (i.e., from the positive side to the negative side of the Y axis), ink is ejected from the nozzle surface of the head part 48 toward the nail 6 of the finger 4 so as to print on the nail 6 of the finger 4.

[1-2. Configuration of Display Medium]

Figure 4:
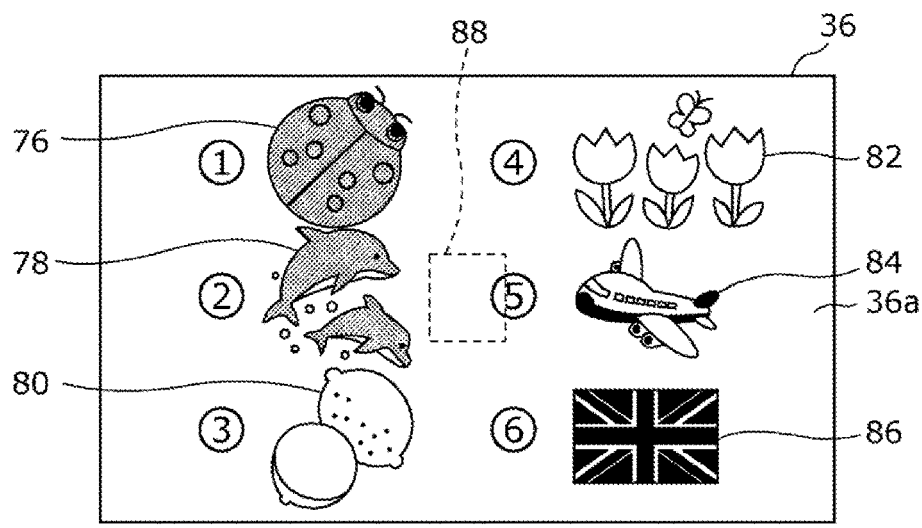
FIG. 4 is a view showing an example of a display medium according to the first embodiment.
Figure 5:
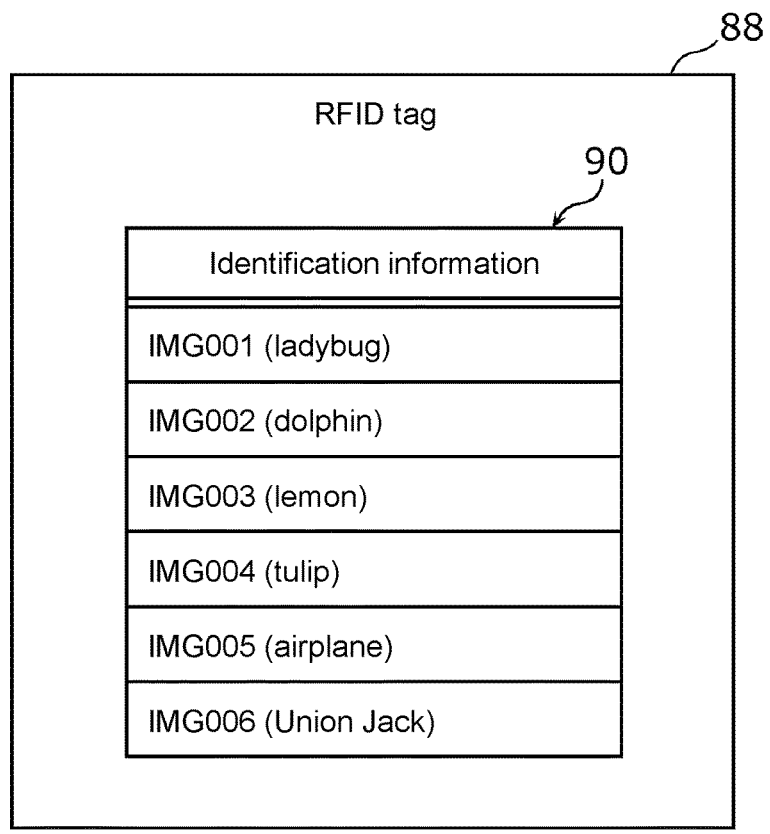
FIG. 5 is a view showing an example of an identification information data table stored in an RFID tag of the display medium according to the first embodiment.

Herein, referring to FIG. 4 and FIG. 5, the display medium 36 used for printing of the printer 2 according to the first embodiment will be described. FIG. 4 is a view showing an example of the display medium 36 according to the first embodiment. FIG. 5 is a view showing an example of an identification information data table 90 stored in the RFID tag 88 of the display medium 36 according to the first embodiment.

As shown in FIG. 4, the display medium 36 is a medium used for printing of the printer 2 described above, and is formed in a rectangular sheet shape made of resin, paper, or the like, for example. A plurality of sample images 76, 78, 80, 82, 84, and 86 (76 to 86) (i.e., an example of a plurality of images) are displayed on a surface 36a of the display medium 36. Each of the plurality of sample images 76 to 86 is a thumbnail of an image printable by the printer 2. In the example shown in FIG. 4, the plurality of sample images 76 to 86 are images (patterns) representing a ladybug, a dolphin, a lemon, a tulip, an airplane, and the Union Jack.

Further, numbers "1", "2", "3", "4", "5", and "6" (i.e., an example of a plurality of first identifiers) associated with the plurality of sample images 76 to 86 are displayed on the surface 36a of the display medium 36. The numbers "1", "2", "3", "4", "5", and "6" displayed on the surface 36a of the display medium 36 are respectively associated with the numbers "1", "2", "3", "4", "5", and "6" displayed on the plurality of operation buttons 24 to 34 of the printer 2.

As shown in FIG. 4, for example, a passive RFID tag 88 (i.e., an example of a non-contact tag) is embedded in the central portion of the display medium 36. As shown in FIG. 5, the RFID tag 88 stores an identification information data table 90. The identification information data table 90 is a data table which stores a plurality of pieces of identification information for identifying the plurality of sample images 76 to 86, respectively.

In the example shown in FIG. 5, identification information "IMG001" for identifying the sample image 76 (ladybug) is stored in the first row of the identification information data table 90. Identification information "IMG002" for identifying the sample image 78 (dolphin) is stored in the second row of the identification information data table 90. Identification information "IMG003" for identifying the sample image 80 (lemon) is stored in the third row of the identification information data table 90. Identification information "IMG004" for identifying the sample image 82 (tulip) is stored in the fourth row of the identification information data table 90. Identification information "IMG005" for identifying the sample image 84 (airplane) is stored in the fifth row of the identification information data table 90. Identification information "IMG006" for identifying the sample image 86 (Union Jack) is stored in the sixth row of the identification information data table 90.

When printing is performed by the printer 2, with the surface 36a of the display medium 36 facing upward, the display medium 36 is placed in the recess 40 (referring to FIG. 2) of the placement area 38 of the housing 8 of the printer 2. Thereby, the reading part 44 of the printer 2 reads the plurality of pieces of identification information "IMG001", "IMG002", "IMG003", "IMG004", "IMG005", and "IMG006" ("IMG001" to "IMG006") stored in the RFID tag 88 of the display medium 36 in a non-contact manner.

In the present embodiment, although the display medium 36 is placed in the recess 40 of the placement area 38 with the surface 36a of the display medium 36 facing upward, the disclosure is not limited thereto. The display medium 36 may also be placed in the recess 40 of the placement area 38 with the surface 36a of the display medium 36 facing downward. Further, the plurality of sample images 76 to 86 may be displayed on the two surfaces (i.e., the front surface 36a and a back surface) of the display medium 36. Also, in that case, when the display medium 36 is placed in the recess 40 of the placement area 38, either of the two surfaces of the display medium 36 may face upward.

[1-3. Functional Configuration of Printer]

Figure 6:
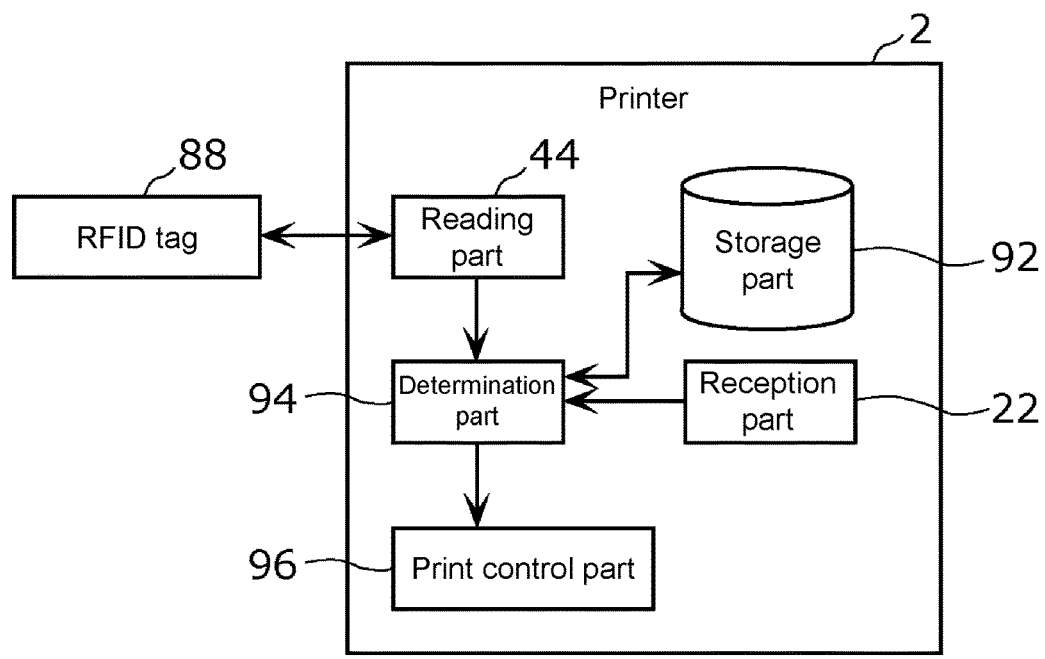
FIG. 6 is a block diagram showing a functional configuration of the printer according to the first embodiment.
Figure 7:
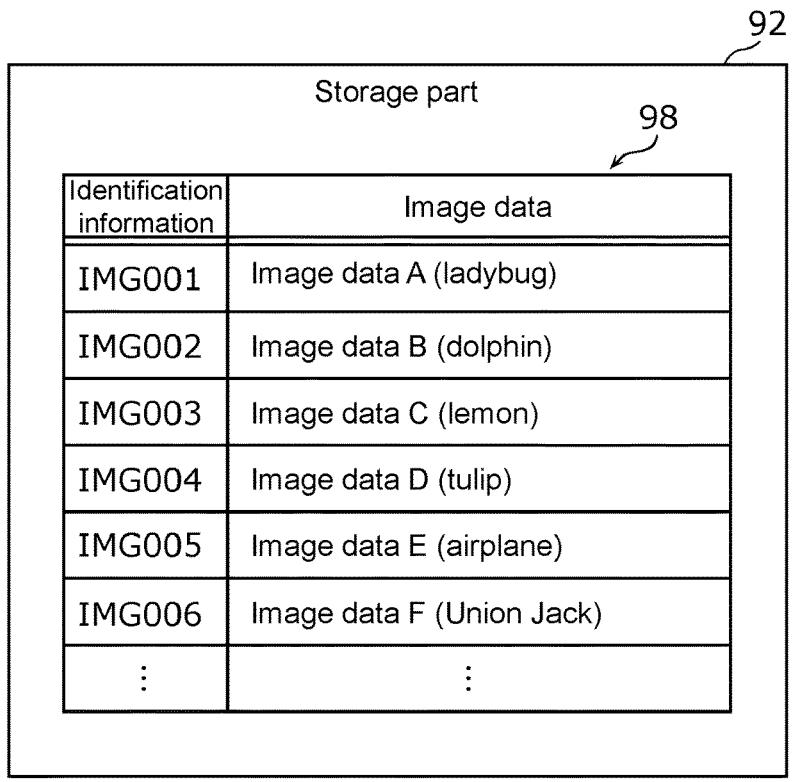
FIG. 7 is a view showing an example of a correspondence information data table stored in a storage part of the printer according to the first embodiment.

Next, referring to FIG. 6 and FIG. 7, the functional configuration of the printer 2 according to the first embodiment will be described. FIG. 6 is a block diagram showing the functional configuration of the printer 2 according to the first embodiment. FIG. 7 is a view showing an example of a correspondence information data table 98 stored in a storage part 92 of the printer 2 according to the first embodiment.

As shown in FIG. 6, the printer 2 includes a reading part 44, a reception part 22, a storage part 92 (i.e., an example of a storage device), a determination part 94, and a print control part 96 as the functional configuration.

As described above, the reading part 44 reads a plurality of pieces of identification information "IMG001" to "IMG006" from the RFID tag 88 of the display medium 36 placed on the placement area 38 (referring to FIG. 2) of the housing 8 in a non-contact manner.

As described above, the reception part 22 receives an operation of selecting any identification information among the plurality of pieces of identification information "IMG001" to "IMG006" read by the reading part 44.

The storage part 92 is a memory which stores a plurality of image data and a correspondence information data table 98 (i.e., an example of correspondence information). The plurality of image data stored in the storage part 92 include an image data A (ladybug), an image data B (dolphin), an image data C (lemon), an image data D (tulip), an image data E (airplane), and an image data F (Union Jack), which respectively represent original images of the plurality of sample images 76 to 86 displayed on the surface 36a of the display medium 36. The plurality of image data stored in the storage part 92 may also include image data other than the plurality of image data A to F described above.

The correspondence information data table 98 is a data table indicating a correspondence relationship between the plurality of image data A to F described above and the plurality of pieces of identification information for identifying the plurality of image data A to F, respectively. In the example shown in FIG. 7, the image data A and the identification information "IMG001" for identifying the image data A are associated with each other in the first row of the correspondence information data table 98. The image data B and the identification information "IMG002" for identifying the image data B are associated with each other in the second row of the correspondence information data table 98. The image data C and the identification information "IMG003" for identifying the image data C are associated with each other in the third row of the correspondence information data table 98. The image data D and the identification information "IMG004" for identifying the image data D are associated with each other in the fourth row of the correspondence information data table 98. The image data E and the identification information "IMG005" for identifying the image data E are associated with each other in the fifth row of the correspondence information data table 98. The image data F and the identification information "IMG006" for identifying the image data F are associated with each other in the sixth row of the correspondence information data table 98.

By referring to the correspondence information data table 98 stored in the storage part 92, the determination part 94 determines, from among the plurality of image data A to F stored in the storage part 92, the image data (i.e., specific image data) associated with the identification information of which a selecting operation has been received by the reception part 22. For example, in the case where the operation of selecting the identification information "IMG001" has been received by the reception part 22 (i.e., in the case where the operation button 24 is pressed), the determination part 94 determines the image data A associated with the identification information "IMG001" from among the plurality of image data A to F stored in the storage part 92. Similarly, for example, in the case where the operation of selecting the identification information "IMG002" has been received by the reception part 22 (i.e., in the case where the operation button 26 is pressed), the determination part 94 determines the image data B associated with the identification information "IMG002" from among the plurality of image data A to F stored in the storage part 92.

The print control part 96 controls printing on the nail 6 of the user's finger 4 based on the image data determined by the determination part 94. For example, in the case where the image data A is determined by the determination part 94, the print control part 96 controls the printing unit 10 so that the image of the ladybug represented by the image data A is printed on the nail 6 of the user's finger 4. Similarly, for example, in the case where the image data B is determined by the determination part 94, the print control part 96 controls the printing unit 10 so that the image of the dolphin represented by the image data B is printed on the nail 6 of the user's finger 4.

[1-4. Method of Using Printer]

Figure 8:
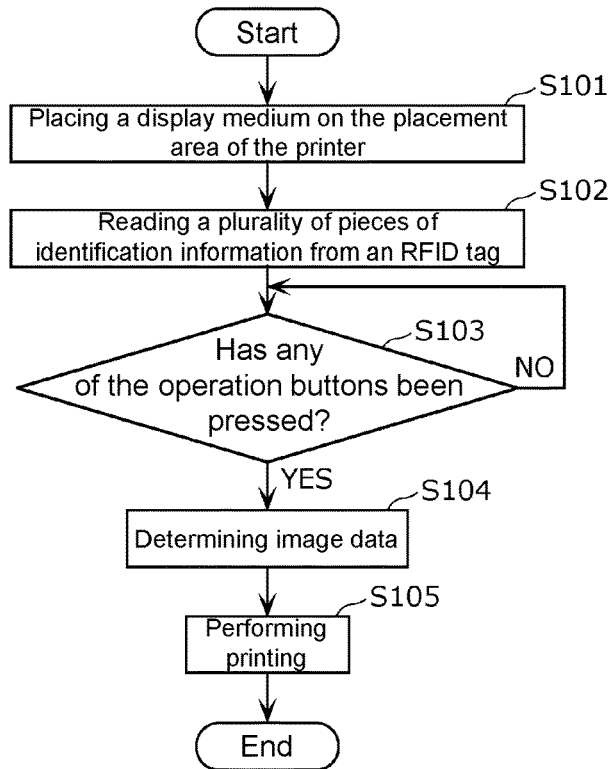
FIG. 8 is a flowchart showing a method of using the printer according to the first embodiment.
Figure 9:
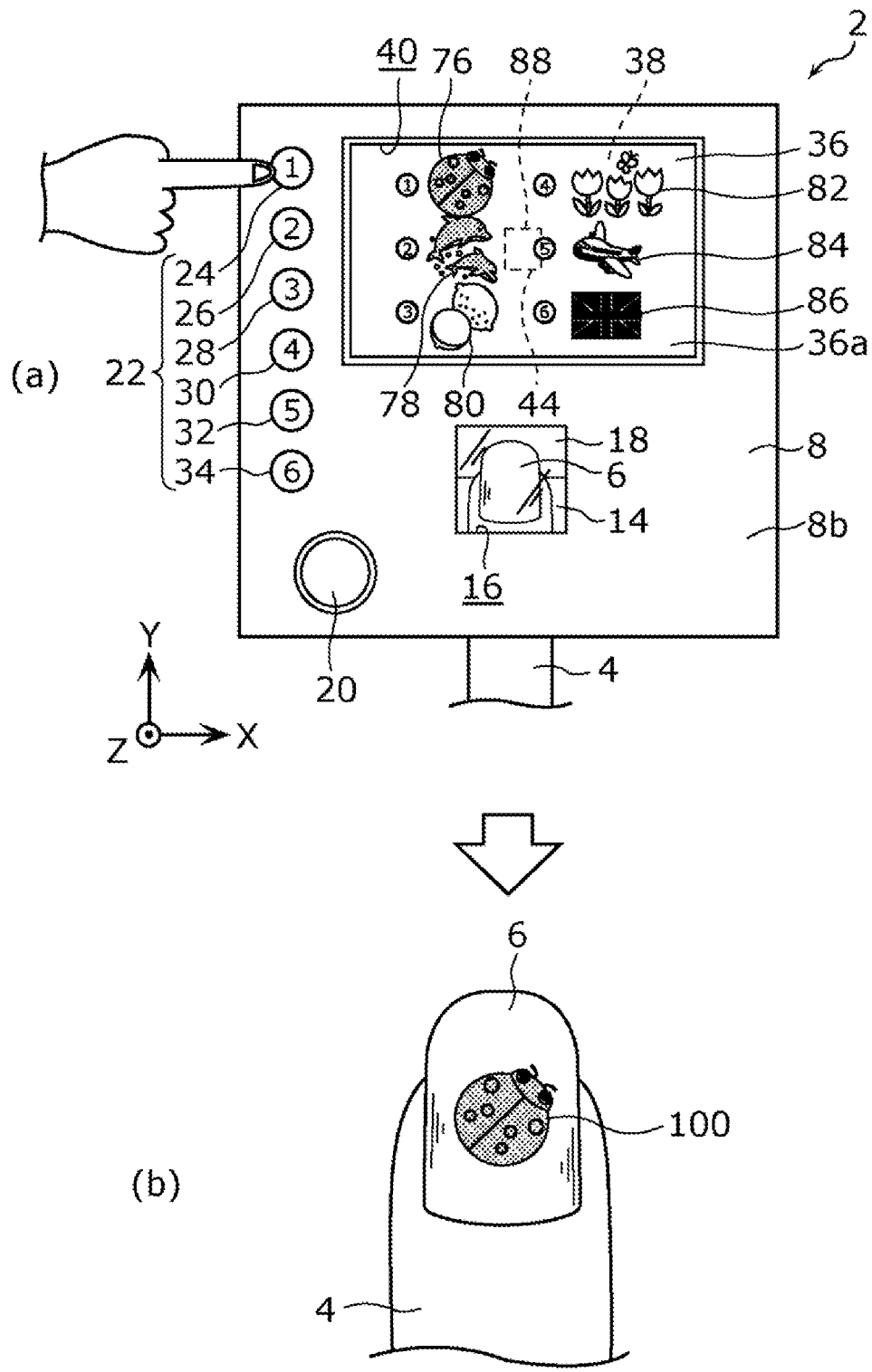
FIG. 9 is a view for describing the method of using the printer according to the first embodiment.

Next, referring to FIG. 8 and FIG. 9, a method of using the printer 2 according to the first embodiment will be described. FIG. 8 is a flowchart showing a method of using the printer 2 according to the first embodiment. FIG. 9 is a view for describing the method of using the printer 2 according to the first embodiment.

As shown in FIG. 8 and (a) of FIG. 9, the user turns on the main power of the printer 2 and then places the display medium 36 in the recess 40 of the placement area 38 of the housing 8 of the printer 2, with the surface 36*a* of the display medium 36 facing upward (S101). At this time, by fitting the display medium 36 in the recess 40, the display medium 36 is positioned in the placement area 38. Thereby, in the XY plan view, the RFID tag 88 of the display medium 36 and the reading part 44 of the printer 2 are arranged so that they overlap each other.

The reading part 44 of the printer 2 reads the plurality of pieces of identification information "IMG001" to "IMG006" stored in the RFID tag 88 of the display medium 36 in a non-contact manner (S102). The plurality of pieces of identification information "IMG001" to "IMG006" read by the reading part 44 are stored in, for example, a temporary memory (not shown), and are respectively associated to the plurality of operation buttons 24 to 34 at the determination part 94. Thereby, each of the plurality of operation buttons 24 to 34 functions as an operation button for receiving an operation of selecting the plurality of pieces of identification information "IMG001" to "IMG006" read by the reading part 44.

In the case where the user does not press any one of the operation buttons 24 to 34 of the printer 2 (i.e., NO in S103), the process returns to step S102.

On the other hand, in the case where the user presses any one of the plurality of operation buttons 24 to 34 of the printer 2 (i.e., YES in S103), from among the plurality of image data A to F stored in the storage part 92, the determination part 94 determines the image data associated with the identification information of which a selecting operation has been received by any one of the plurality of operation buttons 24 to 34 (S104).

As shown in (a) of FIG. 9, the user looks at the plurality of sample images 76 to 86 displayed on the surface 36*a* of the display medium 36 and meanwhile determines the image represented by which sample image is to be printed on the nail 6 of the finger 4. For example, in the case where the user wants to print the image of the ladybug represented by the sample image 76 (i.e., a specific image) among the plurality of sample images 76 to 86 on the nail 6 of the finger 4, the user presses the operation button 24 displaying the same number "1" as the number "1" which is associated with the sample image 76 and displayed on the surface 36*a* of the display medium 36. Thereby, by referring to the correspondence information data table 98 stored in the storage part 92, from among the plurality of image data A to F stored in the storage part 92, the determination part 94 determines the image data A associated with the identification information "IMG001" of which the selecting operation has been received by the operation button 24.

In addition, among the plurality of sample images 76 to 86 displayed on the surface 36*a* of the display medium 36, for example, in the case where the user wants to print the image of the dolphin represented by the sample image 78 on the nail 6 of the finger 4, the user presses the operation button 26 displaying the same number "2" as the number "2" which is associated with the sample image 78 and displayed on the surface 36*a* of the display medium 36. Thereby, by referring to the correspondence information data table 98 stored in the storage part 92, from among the plurality of image data A to F stored in the storage part 92, the determination part 94 determines the image data B associated with the identification information "IMG002" of which the selecting operation has been received by the operation button 26.

Similarly, in the case where the user presses the operation buttons 28 to 34, from among the plurality of image data A to F stored in the storage part 92, the determination part 94 determines the image data C to F which are respectively associated with the identification information "IMG003" to "IMG006" of which the selecting operations have been respectively received by the operation buttons 28 to 34.

At the time when the user presses any one of the plurality of operation buttons 24 to 34, the LED element 46 arranged inside the printer 2 turns on so as to illuminate the inside of the printer 2.

Afterwards, with the nail 6 of the finger 4 facing upward, the user inserts the finger 4 into the opening 12 (referring to FIG. 1) of the housing 8 in a straightened state, and places the pulp side of the finger 4 on the finger holder 14. At this time, by viewing the finger holder 14 from outside of the housing 8 through the viewing window 16, the user aligns the nail 6 of the finger 4 on the finger holder 14.

Then, the user presses the print start button 20 of the printer 2, so that the print control part 96 starts control of printing on the nail 6 of the user's finger 4 based on the image data determined by the determination part 94. Thereby, printing is performed on the nail 6 of the user's finger 4 by the printing unit 10 of the printer 2 (S105).

As shown in (b) of FIG. 9, for example, in the case where the image data A is determined by the determination part 94, the print control part 96 controls the printing unit 10 so that an image 100 of the ladybug represented by the image data A is printed on the nail 6 of the user's finger 4.

Similarly, for example, in the case where the image data B to F are determined by the determination part 94, the print control part 96 controls the printing unit 10 so that an image of the dolphin, an image of the lemon, an image of the tulip, an image of the airplane, and an image of the Union Jack respectively represented by the image data B to F are printed on the nail 6 of the user's finger 4.

The LED element 46 turns off at the time when printing by the printing unit 10 is ended.

[1-5. Effect]

As described above, in the printer 2 according to the first embodiment, in the case where the user wants to print any sample image (e.g., the sample image 76) among the plurality of sample images 76 to 86 displayed on the display medium 36 on the nail 6 of the finger 4, the plurality of pieces of identification information "IMG001" to "IMG006" stored in the RFID tag 88 provided on the display medium 36 are read by the reading part 44 in a non-contact manner. Further, by pressing the operation button 24 among the plurality of operation buttons 24 to 34, the user performs the operation of selecting the identification information "IMG001" corresponding to the sample image 76 desired to be printed. Thereby, from among the plurality of image data A to F stored in the storage part 92, the image data A associated with the identification information "IMG001" of which a selecting operation has been received by the operation button 24 is determined, and printing is performed on the nail 6 of the finger 4 based on the image data A.

Therefore, since the user may simply at least have the RFID tag 88 read by the reading part 44 in a non-contact manner and press the operation button 24 to perform the operation of selecting the identification information "IMG001" corresponding to the sample image 76 desired to be printed, the user's labor can be saved and printing can be performed through a simple operation.

In the present embodiment, although the case where printing is performed by using one type of display medium 36 has been described, printing may also be performed by using a plurality of types of display media 36. In that case, one or more sample images different from each other are displayed on each of the plurality of types of display media 36. In addition, a plurality of image data (e.g., a plurality of image data A to Z) respectively representing original images of all the sample images displayed on the plurality of types of display media 36, and a correspondence information data table 98 indicating a correspondence relationship between the plurality of image data A to Z and a plurality of pieces of identification information for identifying the plurality of image data A to Z are stored in the storage part 92 of the printer 2. Among the plurality of types of display media 36, the user may simply place the display medium 36, on which the sample image desired to be printed is displayed, on the placement area 38 of the housing 8 and press any one of the operation buttons 24 to 34.

Second Embodiment

Figure 10:
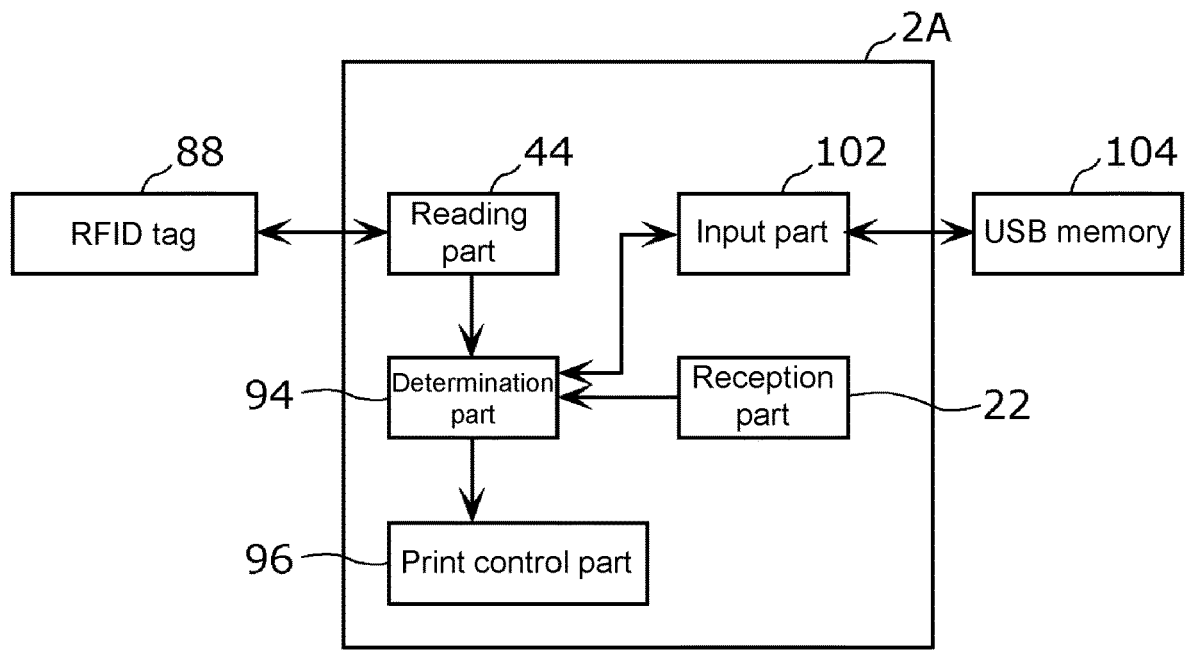
FIG. 10 is a block diagram showing a functional configuration of the printer according to a second embodiment.

Referring to FIG. 10, the functional configuration of a printer 2A according to a second embodiment will be described. FIG. 10 is a block diagram showing the functional configuration of the printer 2A according to the second embodiment. In the embodiments below, components identical to those in the first embodiment above will be labeled with the same reference numerals, and descriptions thereof will be omitted.

As shown in FIG. 10, as the functional configuration, the printer 2A according to the second embodiment includes an input part 102 instead of the storage part 92 described in the first embodiment. The input part 102 is a USB (Universal Serial Bus) port into which a USB memory 104 (i.e., an example of the storage device) is detachably inserted. The various data which are stored in the storage part 92 described in the first embodiment (i.e., the plurality of image data A to F and the correspondence information data table 98 (referring to FIG. 7)) are stored in the USB memory 104.

By referring to the correspondence information data table 98 stored in the USB memory 104, from among the plurality of image data A to F stored in the USB memory 104, the determination part 94 determines the image data associated with the identification information of which a selecting operation has been received by any one of the operation buttons 24 to 34 (referring to FIG. 2).

Therefore, in the present embodiment, since the plurality of image data A to F and the correspondence information data table 98 are stored in the USB memory 104 which is an external memory, the same effect as that in the first embodiment above can be achieved, and the storage capacity of the printer 2 can be reduced.

Third Embodiment

Figure 11:
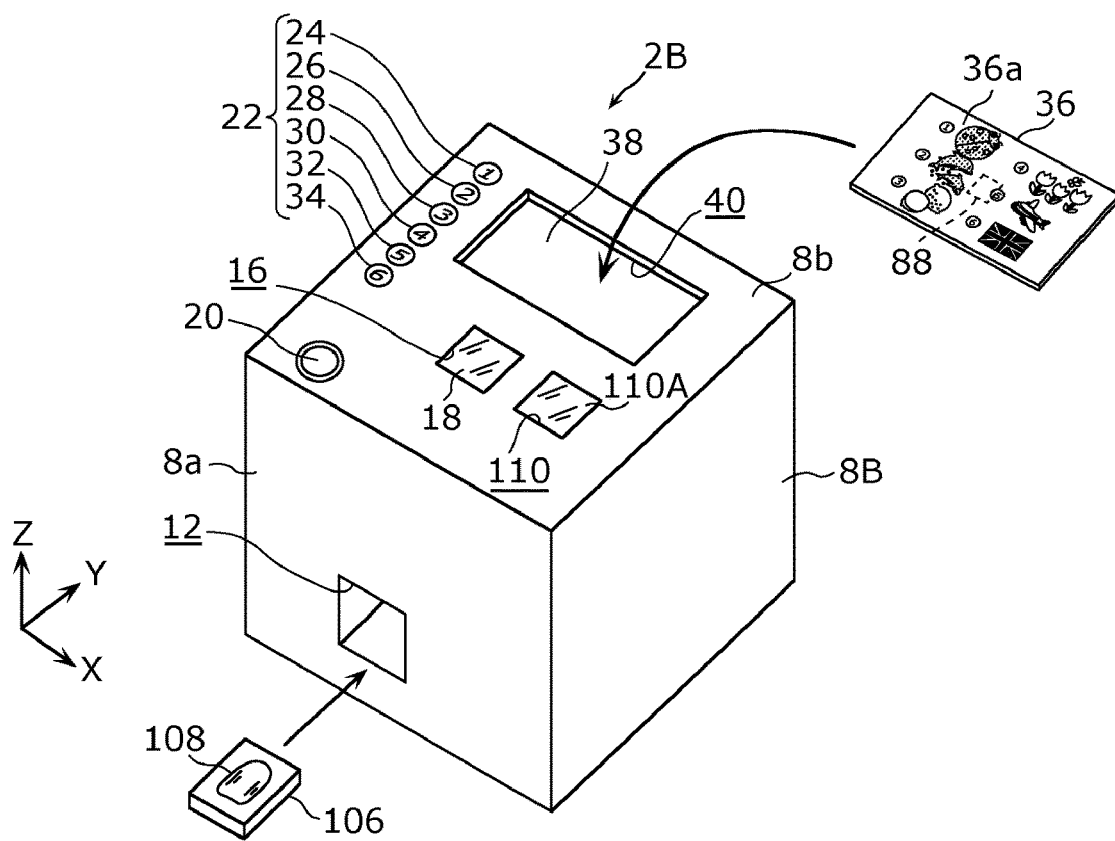
FIG. 11 is a perspective view showing a printer according to a third embodiment.

Referring to FIG. 11, the structure of a printer 2B according to a third embodiment will be described. FIG. 11 is a perspective view showing the printer 2B according to the third embodiment.

As shown in FIG. 11, in the printer 2B according to the third embodiment, a tray 106 (i.e., an example of the placement part) is arranged inside a housing 8B instead of the finger holder 14 described in the first embodiment above. With a nail tip 108 (i.e., an example of the recording medium), which is a so-called artificial nail, placed on the tray 106, the user inserts the tray 106 into the housing 8B through the opening 12 of the housing 8B. A sensor (not shown) for detecting that the tray 106 has been inserted into the housing 8B is arranged inside the housing 8B. Thereby, printing is performed on the nail tip 108 placed on the tray 106.

Further, as shown in FIG. 11, a lighting window 110 for letting the light outside of the housing 8B into the housing 8B is formed on the top surface 8b of the housing 8B. In addition, in the present embodiment, the LED element 46 described in the first embodiment above is not provided. A light-transmitting plate 110A made of, for example, a light-transmissive resin is arranged at the lighting window 110. The light-transmitting plate 110A has the same function as that of the light-transmitting plate 18 described in the first embodiment above. By having the light outside of the housing 8B irradiated inside of the housing 8B through the lighting window 110, the user can easily align the nail tip 108 on the tray 106 while viewing the tray 106 from outside of the housing 8B through the viewing window 16.

In the present embodiment, although the light-transmitting plate 110A is arranged at the lighting window 110, a lens for light diffusion may also be arranged at the lighting window 110 instead of the light-transmitting plate 110A.

Fourth Embodiment

Figure 12:
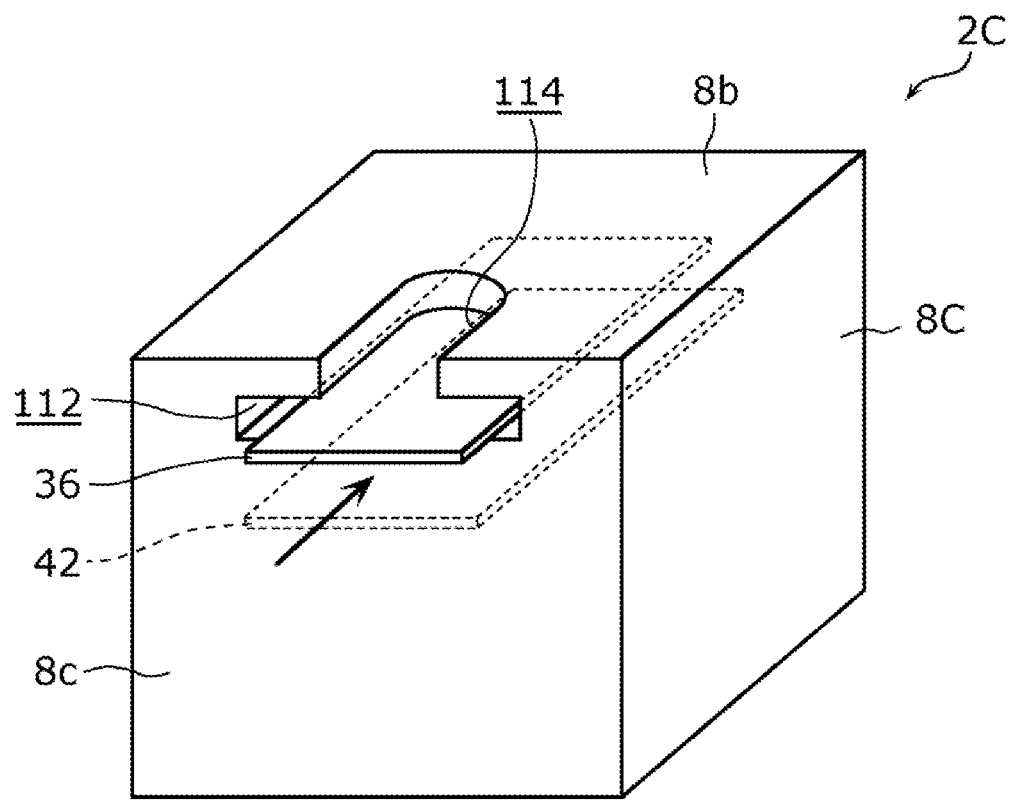
FIG. 12 is a perspective view showing a printer according to a fourth embodiment.

Referring to FIG. 12, the structure of a printer 2C according to a fourth embodiment will be described. FIG. 12 is a perspective view showing the printer 2C according to the fourth embodiment. For convenience of description, in FIG. 12, illustration of the viewing window 16, the print start button 20, the plurality of operation buttons 24 to 34, and the like (referring to FIG. 1) arranged on the top surface 8b of a housing 8C is omitted, and illustration of the plurality of sample images 76 to 86 and the like (referring to FIG. 4) displayed on the display medium 36 is omitted.

As shown in FIG. 12, in the printer 2C according to the fourth embodiment, an insertion hole 112 for inserting the display medium 36 into the housing 8C in a substantially horizontal direction (i.e., the negative direction of the Y axis) is formed on a rear surface 8c of the housing 8C. A notch 114 which communicates with the insertion hole 112 is formed on the top surface 8b of the housing 8C. The placement area 38 described in the first embodiment above is not arranged on the top surface 8b of the housing 8C.

Further, inside the housing 8C, the printed wiring board 42 is arranged substantially parallel to the display medium 36 inserted into the insertion hole 112 and is arranged right below the display medium 36.

The user inserts the display medium 36 into the insertion hole 112 in the negative direction of the Y axis, so that the reading part 44 (referring to FIG. 3) mounted on the printed wiring board 42 reads the plurality of pieces of identification information stored in the RFID tag 88 (referring to FIG. 4) of the display medium 36 in a non-contact manner. After printing is ended, the user pulls the display medium 36 from the insertion hole 112 in the positive direction of the Y axis. At this time, the user can pinch the display medium 36 by the fingers of the hand through the notch 114.

Therefore, in the present embodiment, the same effect as that in the first embodiment above can also be achieved.

Fifth Embodiment

Figure 13:
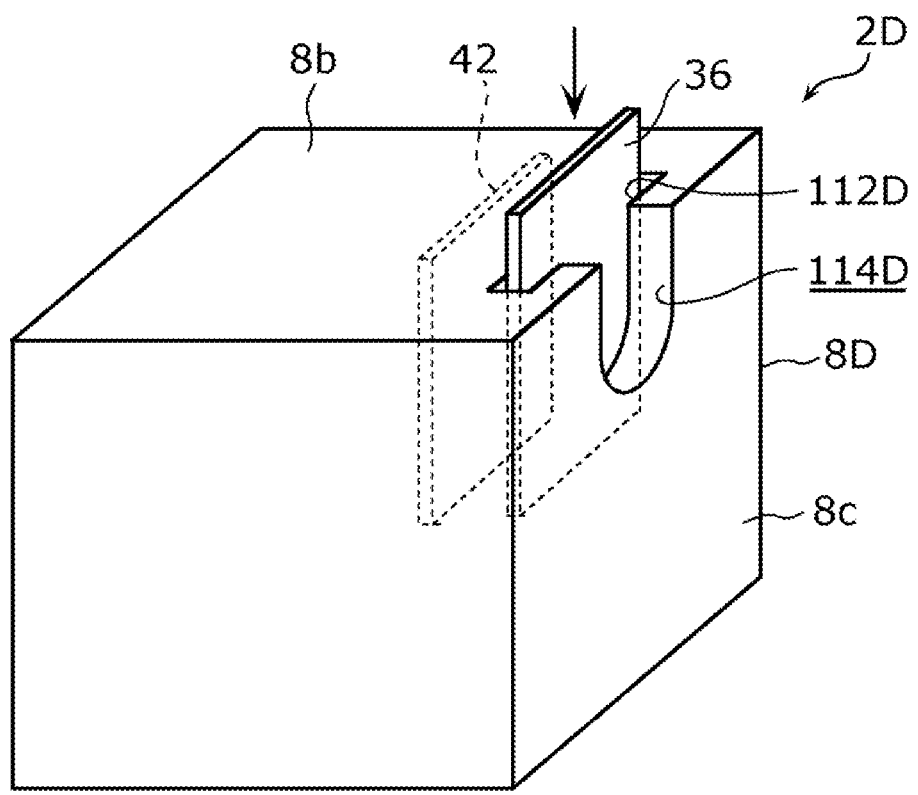
FIG. 13 is a perspective view showing a printer according to a fifth embodiment.
Figure 13:
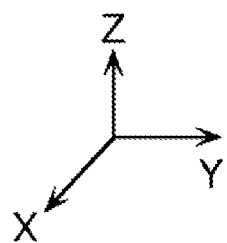

Referring to FIG. 13, the structure of a printer 2D according to a fifth embodiment will be described. FIG. 13 is a perspective view showing the printer 2D according to the fifth embodiment. For convenience of description, in FIG. 13, illustration of the viewing window 16, the print start button 20, the plurality of operation buttons 24 to 34, and the like (referring to FIG. 1) arranged on the top surface 8b of a housing 8D is omitted, and illustration of the plurality of sample images 76 to 86 and the like (referring to FIG. 4) displayed on the display medium 36 is omitted.

As shown in FIG. 13, in the printer 2D according to the fifth embodiment, an insertion hole 112D for inserting the display medium 36 into the housing 8D in a substantially vertical direction (i.e., the negative direction of the Z axis) is formed on the top surface 8b of the housing 8D. A notch 114D which communicates with the insertion hole 112D is formed on the rear surface 8c of the housing 8D. The placement area 38 described in the first embodiment above is not arranged on the top surface 8b of the housing 8D.

Further, inside the housing 8D, the printed wiring board 42 is arranged substantially parallel to the display medium 36 inserted into the insertion hole 112D.

The user inserts the display medium 36 into the insertion hole 112D in the negative direction of the Z axis, so that the reading part 44 (referring to FIG. 3) mounted on the printed wiring board 42 reads the plurality of pieces of identification information stored in the RFID tag 88 (referring to FIG. 4) of the display medium 36 in a non-contact manner. After printing is ended, the user pulls the display medium 36 from the insertion hole 112D in the positive direction of the Z axis. At this time, the user can pinch the display medium 36 by the fingers of the hand through the notch 114D.

Therefore, in the present embodiment, the same effect as that in the first embodiment above can also be achieved.

Embodiment 6

Figure 14:
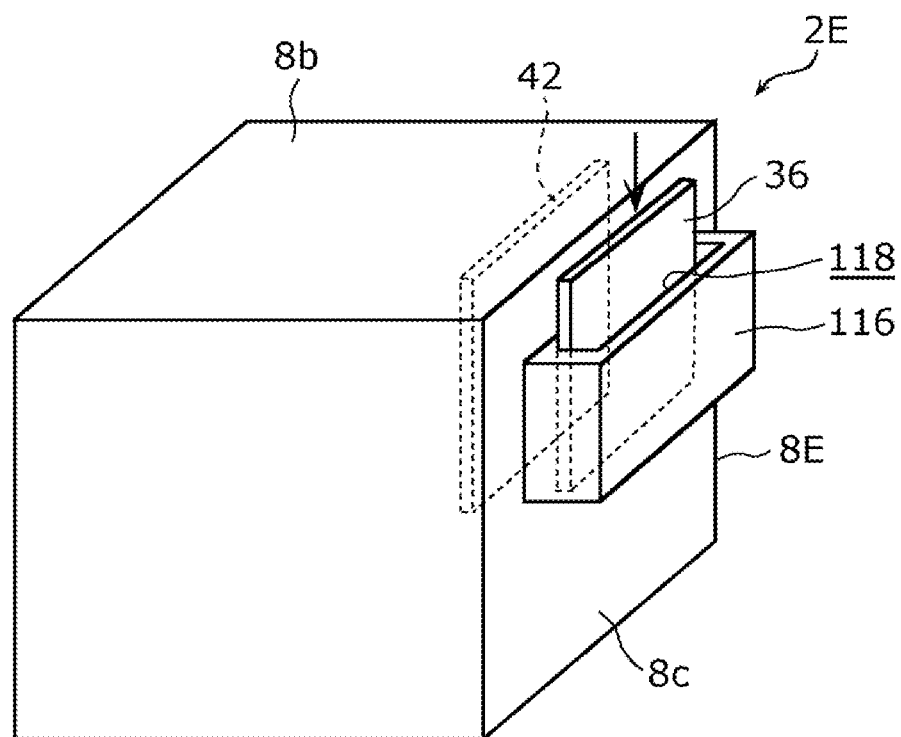
FIG. 14 is a perspective view showing a printer according to a sixth embodiment.
Figure 14:
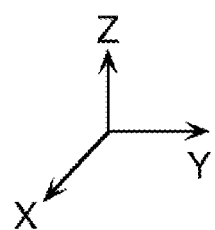

Referring to FIG. 14, the structure of a printer 2E according to a sixth embodiment will be described. FIG. 14 is a perspective view showing the printer 2E according to the sixth embodiment. For convenience of description, in FIG. 14, illustration of the viewing window 16, the print start button 20, the plurality of operation buttons 24 to 34, and the like (referring to FIG. 1) arranged on the top surface 8b of a housing 8E is omitted, and illustration of the plurality of sample images 76 to 86 and the like (referring to FIG. 4) displayed on the display medium 36 is omitted.

As shown in FIG. 14, in the printer 2E according to the sixth embodiment, a holder 116 for holding the display medium 36 is attached to the rear surface 8c of the housing 8E. An insertion hole 118 for inserting the display medium 36 into the holder 116 in a substantially vertical direction (i.e., the negative direction of the Z axis) is formed on the upper surface of the holder 116. The placement area 38 described in the first embodiment above is not arranged on the top surface 8b of the housing 8E.

Further, inside the housing 8E, the printed wiring board 42 is arranged substantially parallel to the display medium 36 held by the holder 116.

The user inserts the display medium 36 into the insertion hole 118 of the holder 116 in the negative direction of the Z axis, so that the reading part 44 (referring to FIG. 3) mounted on the printed wiring board 42 reads the plurality of pieces of identification information stored in the RFID tag 88 (referring to FIG. 4) of the display medium 36 in a non-contact manner. After printing is ended, the user pulls the display medium 36 from the insertion hole 118 of the holder 116 in the positive direction of the Z axis.

Therefore, in the present embodiment, the same effect as that in the first embodiment above can also be achieved.

Modification Examples

Although the printers according to the first to sixth embodiments of the disclosure have been described above, the disclosure is not limited to the above embodiments. For example, the above embodiments may be combined with each other.

In the above embodiments, although the printing method of the printing unit 10 is the inkjet method, the printing method is not limited thereto, and other printing methods may also be adopted.

In the above embodiments, although the plurality of sample images 76 to 86 are displayed on the display medium 36, the disclosure is not limited thereto, and it is also possible that only one sample image (e.g., only the sample image 76) is displayed. In that case, only one piece of identification information (e.g., only "IMG001") for identifying the one sample image is stored in the RFID tag 88. In that case, the reception part 22 may be omitted from the printer 2.

In the above embodiments, although the plurality of image data and the correspondence information data table 98 are stored in the storage part 92 of the printer 2 or the USB memory 104, the disclosure is not limited thereto, and for example, the plurality of image data and the correspondence information data table 98 may also be stored in any storage device such as the RFID tag 88 or an external server.

In the first to third embodiments, although the display medium 36 is placed on the placement area 38 of the housing 8 (8B) of the printer 2 (2A, 2B) to have the RFID tag 88 read by the reading part 44 in a non-contact manner, the disclosure is not limited thereto, and it is also possible to touch the display medium 36 on the placement area 38 to have the RFID tag 88 read by the reading part 44 in a non-contact manner.

In the above embodiments, although the nail 6 of the user's finger 4 and the nail tip 108 are adopted as the recording medium on which the printer 2 (2A, 2B, 2C, 2D, 2E) prints, the disclosure is not limited thereto, and any recording medium such as a printing paper, a smartphone case, a golf ball, and the like may also be adopted.

In the above embodiments, although the reception part 22 is configured to have the plurality of operation buttons 24 to 34, the disclosure is not limited thereto, and for example, the reception part 22 may also be configured with a touch panel.

In the above embodiments, although the drive mechanism 50 of the printing unit 10 moves the head part 48 two-dimensionally in the first direction and the second direction, the disclosure is not limited thereto, and the head part 48 may also be moved one-dimensionally in the first direction. In that case, the printing unit 10 has a transport mechanism for transporting the recording medium in the second direction.

In the above embodiments, although each of the plurality of sample images 76 to 86 displayed on the display medium 36 is a pattern image, the disclosure is not limited thereto, and for example, each of the plurality of sample images 76 to 86 may also be a color-only image.

In the above embodiments, although the first identifier displayed on the display medium 36 and the second identifier displayed on each of the plurality of operation buttons 24 to 34 are numbers, the disclosure is not limited thereto, and they may also be, for example, characters, symbols, graphs, or the like. Alternatively, each of the first identifier and the second identifier may also be a combination of two or more among characters, numbers, symbols, and graphs.

In the above embodiments, although the first identifier displayed on the display medium 36 and the second identifier displayed on each of the plurality of operation buttons 24 to 34 are the same identifier (e.g., the same number), the disclosure is not limited thereto, and the first identifier and the second identifier may also be different identifiers having a predetermined correspondence relationship. For example, the first identifier may be a sea pattern, and the second identifier may be a fish pattern associated with the sea pattern.

In the above embodiments, although the RFID tag 88 is configured as a passive RFID tag, the disclosure is not limited thereto, and for example, it may also be configured as an active RFID tag.

In the above embodiments, although the viewing window 16 is formed on the housing 8 (8B, 8C, 8D, 8E), the disclosure is not limited thereto, and it is also possible to omit the viewing window 16, and arrange a camera for capturing an image of the nail 6 of the finger 4 placed on the finger holder 14 inside the housing 8 (8B, 8C, 8D, 8E). In that case, the image data of the nail 6 captured by the camera is wirelessly transmitted from the printer 2 (2A, 2B, 2C, 2D, 2E) to an external terminal and displayed on a display part of the external terminal. The user can confirm the position of the nail 6 on the finger holder 14 by viewing the image data of the nail 6 displayed on the display part of the external terminal.

In the above embodiments, although the light-transmitting plate 18 is arranged at the viewing window 16 of the housing 8 (8B, 8C, 8D, 8E), a shutter may also be openably/closably arranged at the viewing window 16. When the printer 2 (2A, 2B, 2C, 2D, 2E) is not used, by closing the shutter of the viewing window 16, dust and the like can be prevented from adhering to the light-transmitting plate 18 of the viewing window 16.

Further, in the third embodiment, although the light-transmitting plate 110A is arranged at the lighting window 110 of the housings 8B, 8C, 8D, and 8E, a shutter may also be openably/closably arranged at the lighting window 110. When the printer 2B is not used, by closing the shutter of the lighting window 110, dust and the like can be prevented from adhering to the light-transmitting plate 110A of the lighting window 110.

Further, in the above embodiments, although the reading part 44 is directly mounted on the printed wiring board 42, the disclosure is not limited thereto. For example, the reading part 44 may be an external antenna of a type which is not directly mounted on the printed wiring board 42, and the reading part 44 may be fixed on the printed wiring board 42 in a state where the reading part 44 is electrically connected to a connector mounted on the printed wiring board 42.

Alternatively, for example, the reading part 44 may be the above external antenna, and the reading part 44 may be fixed to any position of the printer 2 (2A, 2B, 2C, 2D, 2E) other than on the printed wiring board 42 in a state where the reading part 44 is electrically connected to a connector mounted on the printed wiring board 42 via a wiring cable.

The disclosure may be applied, for example, as a nail printer or the like for printing on a nail of a finger.

What is claimed is:

1. A printer for printing on a recording medium, comprising:
  a wireless tag reader which reads specific identification information in a non-contact manner from a non-contact tag in which the specific identification information for identifying a specific image is stored, wherein the non-contact tag is provided on a display medium on which the specific image is displayed;
  a processor which refers to a storage device in which a plurality of image data comprising a specific image data representing the specific image and correspondence information indicating a correspondence relationship between the plurality of image data and a plurality of pieces of identification information for identifying the plurality of image data respectively are stored, so as to determine, from among the plurality of image data, the specific image data associated with the specific identification information read by the wireless tag reader;
  a print control part which controls printing on the recording medium based on the determined specific image data; and
  a reception part having a plurality of operation buttons, and each of the plurality of operation buttons receives an operation of selecting the specific identification information among the plurality of pieces of identification information read by the wireless tag reader, wherein a plurality of images including the specific image are displayed on the display medium, the plurality of pieces of identification information, including the specific identification information, for identifying the plurality of images respectively are stored in the non-contact tag, the wireless tag reader reads the plurality of pieces of identification information from the non-contact tag in a non-contact manner, by referring to the storage device in which the plurality of image data respectively representing the plurality of images and the correspondence information are stored, the processor determines, from among the plurality of image data, the specific image data associated with the specific identification information of which a selecting operation has been received by the reception part, and wherein the display medium further displays a plurality of first identifiers respectively associated with the plurality of images displayed on the display medium, and the plurality of operation buttons respectively display a plurality of second identifiers respectively corresponding to the plurality of first identifiers and receive operations of respectively selecting one of the plurality of pieces of identification information read by the wireless tag reader.

2. The printer according to claim 1, wherein
each of the plurality of first identifiers and the plurality of second identifiers comprises at least one of a character, a number, a symbol, and a graph.

3. The printer according to claim 1, wherein
the display medium is formed in a sheet shape, and
the plurality of images and the plurality of first identifiers are displayed on a surface of the display medium.

4. The printer according to claim 1, further comprising a housing which accommodates therein a printing part, wherein
a placement area for placing the display medium is arranged on the housing, and
the wireless tag reader is arranged corresponding to the placement area.

5. The printer according to claim 4, wherein
a recess for positioning the display medium is formed in the placement area.

6. The printer according to claim 4, wherein
a holder for placing the recording medium is arranged inside the housing, and
a viewing window for viewing the holder from outside of the housing when aligning the recording medium on the holder is further formed on the housing.

* * * * *